July 27, 1943.                E. ANDREWS                2,325,092
                          ELECTRIC MOTOR CONTROL
                           Filed Oct. 17, 1941
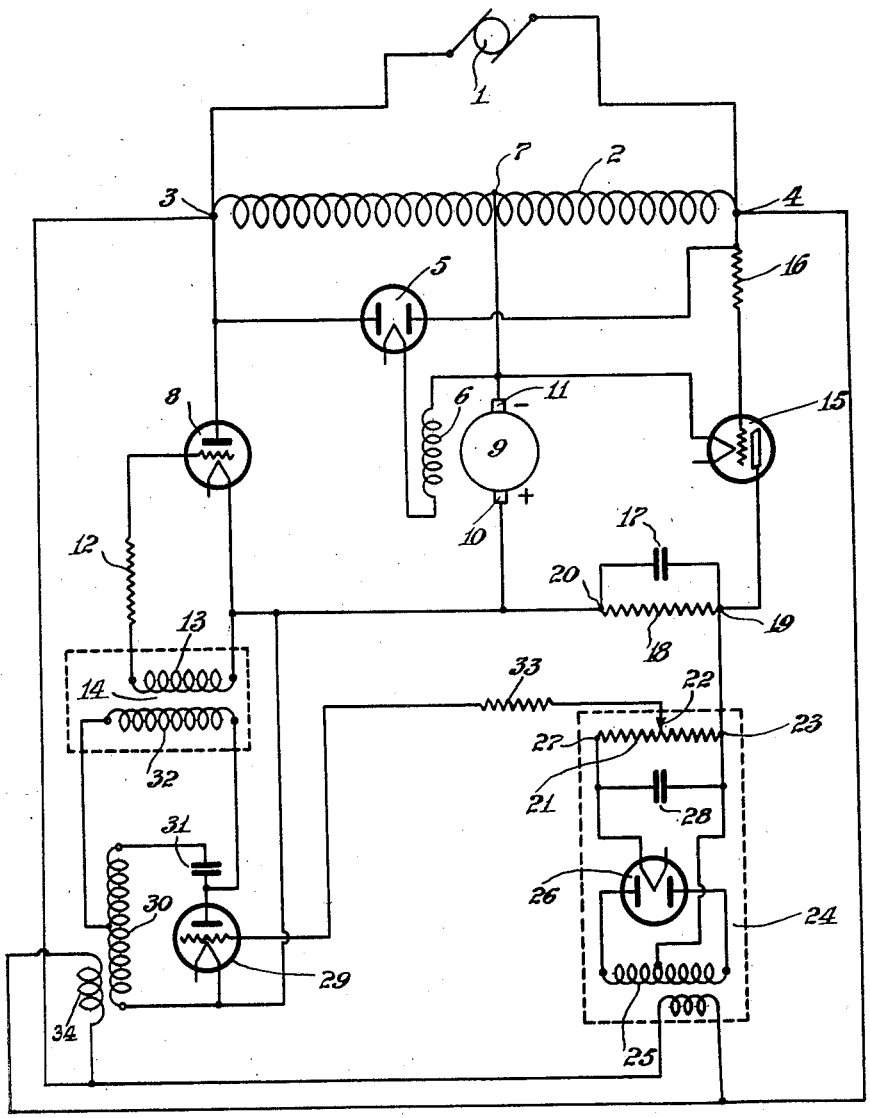
INVENTOR
Elmer Andrews
BY
ATTORNEY Patented July 27, 1943

2,325,092

UNITED STATES PATENT OFFICE 2,325,092

ELECTRIC MOTOR CONTROL

Elmer Andrews, Woodcliff, N. J., assignor to Callite Tungsten Corporation, Union City, N. J., a corporation of Delaware Application October 17, 1941, Serial No. 415,358

2 Claims. (Cl. 171—312)

This invention relates to new and useful improvements in electronic motor control and more particularly in a speed control for D. C. motors operated on an A. C. line.

One object of the present invention is to permit taking of the control voltage direct from the motor armature and without the necessity of providing an auxiliary generator or special mechanical coupling.

Another object is accurately to control the motor speed over a wide range above as well as below the rated motor speed.

A further object is to provide a control system composed of standard parts which may be readily connected with a D. C. motor or which may be assembled into a compact unit with or without the motor.

These objects are attained by means of a preferred embodiment which will now be explained with the aid of the drawing which diagrammatically illustrates the invention.

A source 1 of 220 v. A. C. is connected to the two terminals of a center-tapped auto-transformer 2. A 110 v. source would be connected across terminal 3 and center tap 7. The terminals 3 and 4 of the transformer are connected to the two anodes of a full-wave diode type mercury vapor rectifier 5. The filament of the diode is connected through field winding 6 of a D. C. motor to the midpoint 7 of auto-transformer 2. Thus, part of the output of the auto-transformer is rectified and the current adjusted to field current rating is fed to the field winding of the D. C. motor.

A rectifier tube 8 of the gas conduction grid controlled half-wave type causes half waves of rectified A. C. to flow through armature 9 of the motor and cause its rotation. During what may be considered the negative half cycles, i. e. when the anode of 8 is negative, the armature acts as a generator and sets up a counter E. M. F. The anode of tube 8 is connected with terminal 3 of the transformer 2, and the cathode with the positive terminal 10 of the motor armature. The negative terminal 11 of the armature is connected with the cathode of rectifier 5 over field winding 6 and also with the midpoint of the transformer 2. The grid and cathode of tube 8 are interconnected over a 50,000 ohms resistance 12, and the primary winding 13 of an audio frequency transformer 14.

During the negative half cycles, positive potential is applied to the grid of a high vacuum triode 15 over a very high resistance 16, e. g., of the order of several megohms. Tube 15 operates as an electronic switch and connects the motor armature 9 across a condenser 17. When positive potential is applied to the grid of the switching tube 15, then while the grid draws current almost the entire applied voltage will be developed across the resistor 16 in the grid circuit. The grid of tube 15 will, therefore, remain essentially at zero potential. The plate cathode resistance of a triode like 16 is small when its grid is at zero potential. Hence, the counter E. M. F. of the motor will be applied through the low resistance constituted by tube 15 across the resistor 18 and capacity 17. When the negative potential is applied to the grid of tube 15, then the plate resistance of this tube will become infinitely greater and no current will flow in the circuit of the tube. During the negative half cycles the condenser 17 will be charged to a voltage determined by the counter E. M. F. developed by the armature, i. e., in proportion to the speed of the motor.

In order to insure sensitive response to slight speed changes, a resistor 18 is shunted across condenser 17 through which the condenser may discharge fast enough to prevent blocking of the next charging should the speed of the motor decrease. For a 1 microfarad condenser, the value of the resistor should be 0.5 megohm.

The voltage applied across condenser 17 at points 19 and 20 is bucked against a standard voltage developed across a resistor 21.

The source of the standard voltage is indicated at 24. Although any suitable source of D. C. may be employed, in the present case I employ an auto-transformer 25 having a center tap connected to terminal 23. A suitable source of A. C. is applied across the right hand end and center tap of transformer winding 25 by a means such as the primary winding shown. The ends of coil 25 are connected to the two anodes of a full wave rectifier tube 26. The filament of rectifier 26 is connected to the second terminal 27 of resistor 21. The resistor is shunted by a smoothing condenser 28, the value of which, for a 0.1 megohm resistor should be 16 μF. The resistor 21 with movable contact 22 constitutes a potentiometer.

The difference between the values of the voltages developed across 22—23 and 19—20 is applied to the grid of a high μ triode 29 over a resistance 33 (0.3 megohm). Tube 29 operates as a variable resistance in a resistance-capacity phase shift assembly. The assembly consists of an auto-transformer coil 30 connected over a condenser 31 (.025 μF) between the anode and the cathode of tube 29. A suitable source of A. C. in phase with the source 1 is applied across the lower portion of winding 30 by a means such as the primary winding 34. Winding 32 of the transformer 14 is bridged between the anode of 29 and the midpoint of coil 30. It is possible to derive from any alternating current source a voltage differing in phase from the original voltage by any amount. Usually a resistance-reactance network is used for this purpose. In the present case, the triode 29 is the variable resistance and capacitance 31 constitutes the reactance of the network. The plate-cathode resistance of tube 29 is varied in accordance with the voltage applied to the grid of the tube.

Any variation in the counter E. M. F. generated by armature 9 causes through the agency of the grid a change in the cathode-anode resistance of tube 29 and thus in the phase shift assembly. The shifted voltage is communicated over transformer 14, functioning as an insulating transformer, to the grid of the half wave rectifier 8, applying voltage thereto more or less (up to 180°) out of phase with the voltage applied to the plate of 8. Since the plate of tube 8 is excited from the A. C. line, its voltage will be in the same phase as the voltage in the line. The phase of the grid voltage in tube 8 is variable with respect to the phase of alternating current source 1 under the control of the phase shift network. Therefore, it is possible to control the fraction of the half cycle over which the tube 8 will pass current so that smooth power control will be obtained from zero to full power. In other words, the tube 8 will be conducting over variable portions of a half cycle, the magnitude of the portion being determined by the phase difference determined in turn by the phase shift of the network.

If the voltage difference between 22—23 and 19—20 were applied direct to the grid of 8, then the control would extend only over one-quarter of a full cycle of the current. The triode 29 has high amplification insuring sensitive control of armature 9 through tube 8. Another type of reactor would be sluggish.

In operation, as load is added to the motor, the motor speed and counter E. M. F. drop, voltage across terminals 19, 20 drops and point 22 becomes positive with respect to point 20. This will make the grid of tube 29 more positive than it was before, thus decreasing the plate-cathode resistance of tube 29. The phase position of the grid voltage of tube 8 will be retarded, and this, in turn, will cause rectifier 8 to be conductive over a greater portion of the half cycle than it was before. More power will be delivered to the armature 9 of the motor and the speed of the motor will be restored.

When it is desired to change the speed of the motor from one value to another, the movable contact 22 is displaced changing by the simple potentiometer adjustment the voltage across 22—23. Higher speeds are obtained by increasing, i. e., moving to the left, and lower speeds by decreasing this voltage, i. e., moving the contact 22 to the right.

It will be seen from the above that the control voltage is taken direct from the operating motor armature 9. The advantage of a pilot generator is secured simply by providing an electronic switching tube 15 and without any mechanical coupling arrangement or auxiliary generator. Where 60 cycles are used the triode will make speed adjustments 60 times per second.

Whereas in arrangements effecting motor control over the field winding control is possible only at the rated motor speed and above, with the present arrangement control is possible below and above the rated motor speed by varying the control of the grid of tube 8. Accurate and stable speed regulation can be attained up to a range of ten to one, e. g., 1800 to 180 R. P. M. Less stable control can be extended to a ratio of twenty to one by applying higher voltage across an auto-transformer like 2.

It will be obvious to those skilled in the art that the devices and values need not always be employed strictly as above specified, and that the assembly need not be produced as a single unit. For instance, the control elements may be separately assembled and then applied as a unit to a D. C. motor circuit.

What I claim is:

1. In a system for controlling the speed of a D. C. motor having an armature and a field winding, a source of alternating current for feeding the field of the motor, including a center tapped auto-transformer and a full wave rectifier having an anode connected with each end terminal of the transformer and a cathode connected in series with the field winding to the midpoint of the transformer, means comprising a grid controlled gas conduction half-wave rectifier tube connected so as to apply power from said source to the armature by causing half-waves of rectified A. C. to flow therethrough, a control voltage circuit including in series the terminals of the armature, a condenser and a resistance in parallel with one another, and the output circuit of a high vacuum electronic switch, having an anode and a cathode constituting said output circuit and having a grid connected through a high resistance to the opposite side of the A. C. power supply from that to which the half-wave rectifier is connected, said condenser being charged to a voltage determined by the C. E. M. F. developed by the armature when connected thereto by said switch on every alternate half cycle, the relative value of said resistance connected to said condenser being so adjusted that the charge from the condenser will leak off fast enough to prevent blocking should the speed of the armature decrease, a potentiometer, means for supplying a standard voltage thereacross and series connections whereby a predetermined fraction of said standard voltage is bucked against the voltage developed across said condenser; a resistance-capacity phase-shift assembly including a high $\mu$ triode, an auto-transformer excited by A. C. in phase with said source and a condenser connected in series across the cathode and anode of the last mentioned triode, a series connection from said first mentioned condenser to one end of said potentiometer, a series connection from the movable contact of the potentiometer to the grid of said last mentioned triode so as to apply thereto the difference between the control and the bucking voltage, an isolating transformer having a first winding bridged across the cathode and grid of said grid controlled rectifier tube and having a second winding connected in the phase-shift assembly across the midpoint of the auto-shift assembly across the anode of the triode, wherein by variations in the counter E. M. F. generated by the armature passing through said high vacuum electronic switch, are stored in said first mentioned condenser and are serially communicated through the voltage bucking potentiometer to the grid of the triode of the phase-shift assembly, whereby the degree of phase-shift is altered according to the net value of potential reaching the grid and thereby is altered the effective output of the rectifier tube, so as to vary the power applied to the armature and so as to keep the speed thereof substantially constant for any predetermined value of said bucking voltage.

2. A system for controlling the speed of a D. C. motor operated on an A. C. source of power, including rectifier means connected to said source and feeding D. C. to the motor field, a half-wave grid controlled gas rectifier connected to said source and feeding half-waves of D. C. to the motor armature, a speed control condenser, switching means actuated 180° out of phase with said half-wave rectifier and connecting said condenser to and charging it by the C. E. M. F. of the motor armature on alternate half-waves, leakage discharge means for said condenser, a source of predetermined bucking voltage connected serially to said condenser, an electronic phase-shifter of the resistance-capacity type excited from said A. C. source, a connection feeding the differential of the condenser charge and the bucking voltage to the control grid of said electronic phase-shifter so as to determine the degree of phase-shift, and means coupling the output of said phase-shifter to the control grid of said gas rectifier, whereby the effective output thereof and the speed of the motor are controlled.

ELMER ANDREWS.